(12) United States Patent
Kim

(10) Patent No.: US 7,028,663 B1
(45) Date of Patent: Apr. 18, 2006

(54) FLUID SWIRLING DEVICE

(76) Inventor: Jay S. Kim, 9728 Alburtis Ave., Sanat Fe Springs, CA (US) 90670

( * ) Notice: Subject to any disclaimer, the term of this patent is extended or adjusted under 35 U.S.C. 154(b) by 0 days.

(21) Appl. No.: 11/042,101

(22) Filed: Jan. 26, 2005

(51) Int. Cl.
*F02M 29/00* (2006.01)
*B21K 3/00* (2006.01)

(52) U.S. Cl. .................... 123/306; 123/590; 60/309; 60/324

(58) Field of Classification Search ............... 123/306, 123/590, 592, 593; 60/309, 324; 422/176
See application file for complete search history.

(56) References Cited

U.S. PATENT DOCUMENTS

| | | | |
|---|---|---|---|
| 1,345,791 A * | 7/1920 | Livingstone | 48/189.4 |
| 4,515,138 A * | 5/1985 | Agadi | 123/590 |
| 4,729,776 A | 3/1988 | Elliff | |
| 4,962,042 A | 10/1990 | Kim | |
| 5,113,838 A | 5/1992 | Kim | |
| 5,916,134 A * | 6/1999 | Yang et al. | 60/299 |
| 5,947,081 A | 9/1999 | Kim | |
| 6,041,753 A * | 3/2000 | Lin et al. | 123/306 |
| 6,158,412 A | 12/2000 | Kim | |
| 6,258,144 B1 * | 7/2001 | Huang | 55/385.3 |
| D469,781 S | 2/2003 | Kim | |
| 6,796,296 B1 | 9/2004 | Kim | |

* cited by examiner

*Primary Examiner*—Hai Huynh
(74) *Attorney, Agent, or Firm*—Chris Papageorge

(57) ABSTRACT

The device includes a pair of flat planar vanes securely mounted within a cylindrical housing. The vanes have a medial slit extending from the center to a longitudinal end of the vane. The vanes are interconnected at the slits so that they are in criss-cross positioning. The vanes are axially angled so that when positioned in an intake air duct the vanes impart a swirling motion to the air entering the engine providing more complete mixing of the air and fuel and when positioned in an exhaust passageway the vanes impart a swirling motion to the exhaust gases exiting the engine providing scavenging of the exhaust gases.

26 Claims, 5 Drawing Sheets

FLUID SWIRLING DEVICE

BACKGROUND OF THE INVENTION

The invention relates generally to intake and exhaust systems for internal combustion engines of the type conventionally used in motor vehicles. More specifically, the invention relates to intake and exhaust system components and accessories used to provide improved fuel economy and performance. The invention also more specifically relates to such components and accessories which provide enhanced combustion efficiency by improving mixing of the air and fuel entering the engine or by improving exhaust gas flow through the exhaust system.

In a conventional internal combustion engine's intake system, the fluid flow which moves adjacent the walls of the intake passageway i.e., laminar fluid flow, typically includes a substantial amount of gasoline that is not atomized. Fuel that is not atomized does not readily combust. Thus, incomplete atomization of the fuel in the fluid flow hinders complete combustion of the fluid. This laminar flow consequently reduces the combustion efficiency of the engine. In addition, due to the frictional forces generated by contact of the fluid flow against the walls of the intake passageway, the laminar fluid flow travels through the passageway at a slower velocity than the rest of the fluid flow. Moreover, due to the difference in mass density between the gasoline molecules and the air molecules in the laminar fluid flow, the gasoline molecules experience greater frictional forces via contact with the walls of the passageway than the air molecules resulting in slower moving gasoline molecules than air molecules. This difference in velocity tends to additionally hamper mixing of the gasoline particles with the air particles thereby further contributing to incomplete combustion of the fluid and reducing the efficiency of the engine in converting heat energy to mechanical energy.

Inducing turbulence in the fluid flow passing through the intake passageway reduces laminar fluid flow and moves the slower moving gasoline particles away from the walls of the passageway thereby preventing further deceleration caused by contact with the walls. Both of these effects result in improved mixing of the air and fuel. Such benefits can be realized if turbulence is induced either in the air entering the carburetor (or fuel injection system), in the fluid passing through the intake manifold or intake runners or in the fluid passing through the intake ports or around the intake valves of the engine. Consequently, various devices and systems have been designed to induce such turbulence at various locations in the intake system.

Some prior art devices which are designed to produce turbulence in the air entering the fuel introduction subsystem include vanes which deflect the air passing thereagainst in order to impart a swirling motion to the air. Some such devices include a hub or central member to which the device vanes are attached. The central member provides rigidity to the vanes so that they do not absorb energy of deflection but rather transmit that energy back to the fluid. The central member is typically streamlined in order to reduce obstruction of fluid flow and reduce negative pressure areas which would otherwise create undesired turbulence. Nevertheless, the central member requires a certain degree of structural strength to hold the vanes steady while withstanding the forces of the fast moving fluid flow. In addition, the central member must be a certain relatively large size in order to enable the vanes to be securely and rigidly connected thereto. Due to these requirements, the central member is typically large and thus significantly reduces the cross-sectional area of the intake passageway thereby reducing fluid flow therethrough. The central member also acts to block the air flow at the central area of the intake passageway. Since the highest velocity of fluid flow is in the central area, the highest mass of fluid moving through the passageway is also in the central area. Thus, a blockage in this area is more likely to affect the amount of fluid flow in the passageway than a blockage in another area. Consequently, such central members typically reduce fluid flow through the intake system and thereby reduce the power output of the engine.

Others of such prior art device which induce turbulence through the use of vanes do not utilize a central member in order to eliminate the likelihood that such members would present a significant obstruction to air flow. Such of these devices utilize vanes which are radially curved to attach both ends of the vanes to the same side of the cylindrical housing. However, the vane portions which are at the central area produce higher stresses at the attachment points due to the effects of leverage. In addition, the absence of a secure central connection and thereby lack of rigidity of the vanes at the central area results in deflection movement in response to the forces of the fluid flow. The movement of the vanes may adversely affect the fluid flow movement by setting up harmonics in the fluid, by absorbing energy from the fluid flow or by undesired deflection of the fluid flow. The vanes are often made thicker in an attempt to obviate these shortcomings. However, the thicker vanes reduce the cross-sectional area of the passageway thereby tending to reduce fluid flow through the passageway.

Many of the prior art devices that induce air turbulence are manufactured in various sizes to accommodate the differently sized and structured intake systems of the many makes and models of motor vehicles on the market. Some of these prior art devices are simply dimensioned adequately fit in the duct in which placed while others are designed to be diametrically resilient to exert a force against the inner walls of the intake duct and thereby provide a more snug fit therein. This prevents displacement of the device within the duct and also allows it to accommodate small variations in the diametrical sizes of these ducts. However, due to the oftentimes high vibrations acting on the device while in use and during vehicle operation this snug fit is often not enough to prevent displacement of the device. Displacement of the device from its intended position can result in damage to the device, the duct or other parts of the intake system or engine. As a result of these problems many of these devices are instead designed to fit in other parts of the intake system in which component structures thereof are available to secure the device therein.

One of the primary disadvantages of prior art devices or systems that generate intake air turbulence is that the structures thereof that produce the desired turbulence also restrict air flow through the system. This undesirably reduces the maximum quantity of air and fuel that is delivered into the engine thereby reducing its maximum horsepower output. An example of a prior art device that generates swirling and also turbulence of the intake air is disclosed in U.S. Pat. No. 5,947,081 to Kim. The device disclosed includes vanes which have slits as well as concave and convex portions. The small concave and convex surface portions of the vanes deflect small portions of the air flow at relatively sharp angles of deflection. The high degree of deflection produces turbulence of the air stream. This turbulence includes collision of fluid flow molecules rather than a smooth blending or mixing of the fluid flow. Consequently, the collisions absorb energy thereby reducing the velocity of the fluid flow and consequently reducing fluid flow.

Another important disadvantage of some prior art devices is that they are difficult or expensive to mount in the engine system. Some prior art devices such as that disclosed in U.S. Pat. No. 4,424,777 to Klomp require that they be installed around the intake valves necessitating that the purchaser disassemble the engine and have engine components suitably machined to adapt these components to the device. But, this is typically a time consuming and expensive endeavor rendering such devices impractical for many motor vehicle owners. Similarly, other prior art devices require that they be installed in the intake manifold or runner necessitating that the purchaser disassemble major components of the engine in order to install such devices. But, this is also a time consuming and expensive endeavor requiring a degree of mechanical skill rendering such devices impractical for many motor vehicle owners.

Designers of such prior art intake fluid turbulence generation systems have recognized that the effectiveness of such turbulence varies according to the engine throttle position. U.S. Pat. No. 4,424,598 to Tsutsumi discloses an automobile swirl producing system which is responsive to engine load and engine operating conditions. Basically, the Tsutsumi system uses a pivot shaft responsive to carburetor throttle valve position to alter the swirl produced in the combustion chamber. However, the disadvantage of such a system is that it is difficult to properly install, and this especially discourages many do-it-yourselfers from purchasing it.

Designers of exhaust systems have also recognized that improving the rate of exhaust gas flow out of the engine can provide improved combustion efficiency. There have consequently been many exhaust systems that have sought to increase the velocity of exhaust gas flow out of the exhaust system and thereby in effect scavenge exhaust gases from the combustion chamber and exhaust ports. Some exhaust header systems have been designed to position exhaust pipes around the inner circumference of a collector pipe to produce swirling of the exhaust gases from the collector pipe in a vortex flow and thereby enhance exhaust gas flow therefrom. Such systems have been very effective in improving exhaust as well as intake fluid flow and thereby improving combustion. However, such systems require retuning of the carburetor or fuel injection system and ignition system of the engine as well as replacement of major engine system components and are thus impractical for many motor vehicle owners. In addition, such systems typically do not meet government emission standards requirements and are thus undesirable for the typical vehicle owner.

The many requirements for such air swirling or air turbulence generating devices and systems have resulted in prior art systems and devices in which there are compromises between swirl or turbulence generation and air flow restriction. In addition, there have also been many prior art systems that have been very effective in generating the required swirl or turbulence yet have necessitated undue engine component alterations and labor consumption. Consequently, what is needed is an intake and exhaust fluid swirling device which does not require special tools for installation and thus may be easily manually installed. What is also needed is an intake and exhaust fluid swirling device providing enhanced swirl generation while producing minimal fluid flow restriction. What is additionally needed is such a device which may be securely positioned in passageways of intake and exhaust systems.

SUMMARY OF THE INVENTION

It is a principal object of the present invention to provide an air swirling device that can be positioned in an intake passageway for air entering the fuel introduction subsystem of an internal combustion engine.

It is another object of the present invention to provide an intake and exhaust fluid swirling device having structural components that are angled and shaped to provide enhanced swirling of the fluid flow.

It is another object of the present invention to provide a fluid swirling device having minimal structural components to provide minimal obstruction of fluid flow therethrough.

It is also an object of the present invention to provide a fluid swirling device having minimal thicknesses of structural components to provide minimal restriction of fluid flow therethrough.

It is also an object of the present invention to provide a fluid swirling device having structural components that are shaped to provide minimal restriction of fluid flow therethrough.

It is also an object of the present invention to provide a fluid swirling device having structural components which provide secure retention of the device within intake and exhaust passageways.

It is an object of the present invention to provide a fluid swirling device having structural components which are resilient to provide a snug fit in an intake or exhaust passageway.

It is an object of the present invention to provide a fluid swirling device that does not require disassembly of major engine components for installation thereof.

It is an object of the present invention to provide a fluid swirling device that may be manually installed in an intake or exhaust passageway.

It is an object of the present invention to provide an exhaust gas swirling device that reduces back pressure.

Essentially, the device of the present invention is designed to be positioned in the fluid flow path of an internal combustion engine and deflect the flow passing therethrough so as to induce a rotational or swirling type of movement of the fluid. This swirling movement tends to move the fluid away from the walls of the passageway and reduce continual or prolonged contact with the walls of the passageway which produce frictional forces exerting a drag on the fluid flow. When positioned in an intake passageway, the swirling motion provide enhanced mixing of the air and fuel yielding more complete combustion of the fuel mixture. When positioned in a tailpipe or exhaust pipe, the swirling motion reduces the decrease in exhaust gas velocity that would otherwise occur yielding reduced backpressure and thereby increasing engine power output.

The device achieves its goal of modifying the straight motion of the intake air or exhaust gas flow so as to produce swirling motion of that flow by incorporating vanes which are positioned in the fluid flow stream. The vanes are angled so that they deflect the fluid laterally into a rotational movement. This lateral motion in combination with the longitudinal motion of the fluid stream ultimately results in a swirling or vortex type of motion of the fluid stream.

The device includes a housing within which the vanes are mounted. The housing is open at both longitudinal ends for the fluid flow to pass through. The housing is sized and shaped to accommodate the intake ducts or passageways of various motor vehicles as well as the exhaust pipes of various motor vehicles. This makes it relatively easy for a user to simply manually insert the device into an intake duct or exhaust pipe. However, due to engine vibrations and vehicle jarring type motions, other prior art devices have become dislodged from their desired locations in such ducts. Therefore, the present invention includes structures which engage the passageway in such ways as to enable it to be retained in its desired position therein. These structures include tabs at the lower end of the housing which project outwardly therefrom. The tabs are integral with the housing and resist inward deflection. Thus, when the housing is inserted in a duct (which is diametrically slightly larger than the housing), the resilient tabs engage the duct and exert a resistive force thereagainst. The resistive force prevents undesired movement of the device relative to the duct thus ensuring a tight fit or snug fit. In addition to the effect of the resistive force, the ends of the tabs which contact the inner surfaces of the duct are relatively small thereby providing a gripping surface. The gripping surface also prevents undesired movement of the device relative to the duct.

The retaining structures of the invention also include tabs at the upper end of the housing which similarly project outwardly therefrom. These tabs have outer ends which extend radially from the housing. The underside straight surfaces of the tabs engage the rim of the duct in which the housing is positioned and thereby act to block axial movement of the housing relative to the duct. Thus, the tab ends prevent the housing from undesirably moving deeper into the duct. Moreover, intake systems typically include a component structure that fits over the rim and enabling it to be used to cover the tab ends thus block axial movement of the housing relative to the duct. The blocking effect of that component structure prevents the housing from undesirably moving out of the duct. Thus, when the device is installed in the duct and the intake system is assembled, the tabs prevent movement of the housing relative to the duct in both axial directions. The upper and lower tabs thus enable the device to stay in its desired position within the passageway without the need for screws or other fastener means to anchor it in place. Obviating the need for fasteners results in no need to drill holes in the intake system or otherwise cause structural changes thereto which may weaken it or produce air leaks.

The vanes are mounted within the housing and extend diametrically between the inner walls thereof. The vanes have appendages at the longitudinal ends thereof, and the housing has apertures which receive the appendages. The appendages extend through the apertures, and their ends are positioned flat against the outer surface of the housing and secured thereto in order to attach the vanes at the outer ends thereof to the housing. The vanes have medial slits which extend partway through the vanes, and the vanes are positioned in opposing relationship so that the slit of each vane receives the unslit medial portion of the other vane. The vanes are thus in a criss-cross placement. Since the edges which define the slits abut solid portions of the other vane, this interpositioning prevents movement of the vanes relative to each other in both the axial and radial directions. The unique slit structures and the interpositioning of the vanes obviate the need for a central member to which the vanes would otherwise have to be anchored. Nevertheless, the connection between the vanes is strong as the slit inner ends that engage each other are axially oriented and thus in alignment with the forces of the fluid flow stream providing a structurally strong interconnection. Moreover, each vane is unitary thereby providing structural integrity and rendering it more able to withstand the forces of the fluid flow than a multipiece vane having relatively small connection points at the central area of the housing.

The vanes are axially oriented at their medial portions and thus in alignment with the fluid flow stream forces. This orientation minimizes the forces acting on the vanes at these locations allowing the vanes to be thinner than other comparable prior art devices. There is thus minimal obstruction to fluid flow. Therefore, the present invention provide improved airflow over prior art comparable devices.

The apertures are angled so that the vane portions located at the housing are comparably angled. The angulature of the vanes produces a rotational movement of the fluid flow upon a impacting these vane portions. The opposite end portions of each vane are angled in opposite directions from each other. Each vane is thus in a twisted configuration. Because the vane end portions are angled in opposite directions, the change in angle direction along the longitudinal length of each vane results in the vane being more angled at the housing walls than vane portions closer to the center of the housing. This is desirable because it more efficiently yields the desired swirl effect. This is because the swirl produced is essentially air rotation about a central axis with the more peripheral air at peripheral areas of the passageway rotating more than the air at more centrally located areas. Consequently, flow deflection at the peripheral portions of the housing is more effective in producing the desired fluid rotation about the central axis of the housing. Thus, there is a greater degree of inclination at the peripheral vane portions where there is maximal effectiveness in producing the fluid flow rotational movement. Similarly, near the central area of the housing the vane portions are not significantly angled producing less deflection and concomitantly less fluid flow restriction at the housing area where swirl can less effectively be produced. Since the swirl desirably produced is essentially rotation about a central axis the swirl cannot be efficiently produced at the central axis because the fluid at the central axis rotates very little in comparison with the fluid at the peripheral portions. Consequently, it is most efficient for swirl production that the central area has a small cross-sectional area and no angulature.

The lower apertures are also angled relative to the upper apertures. The lower apertures are angled in the same axial direction but to a greater degree than the upper apertures. This results in the vane being angled upwardly more at its trailing edge than at its leading edge. The upper and lower portions of the vane thus have different angles of inclination so that the fluid stream is deflected first at the upper portion and subsequently deflected again in the same direction at the lower portion to produce a higher degree of deflection. Providing the vane portions with axially increasing angular orientation results in a smoother deflection of the fluid flow. This takes less kinetic energy from the impacting fluid flow than would otherwise result. Consequently, there is minimal reduction in fluid flow velocity.

The device is thus simple in construction with relatively few parts. There is therefore less to present obstructions to the fluid flow. In addition, the slit construction and the interconnection of the vanes provides a structurally strong vane structure able to withstand the forces of the fluid flow without undesired deflection of the vanes.

DETAILED DESCRIPTION OF THE PREFERRED EMBODIMENT

Figure 1:
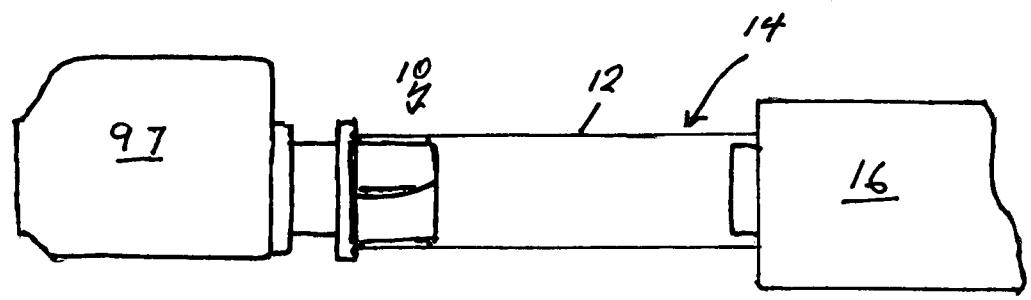
FIG. 1 is a sectional view of an intake air flow subsystem which incorporates the device of the present invention and showing the carburetor and intake duct of the subsystem.

Referring to the drawings, the swirling device of the present invention is generally designated by the numeral 10. The device 10 is sized to fit inside an intake passageway or duct 12 of an intake subsystem 14 of an internal combustion engine (not shown). The passageway 12 leads to a fuel introduction subsystem 16 which may be a fuel injection subsystem, as shown, or a carburetor. The passageway is thus used for delivery of intake air to the fuel injection subsystem 16 from the air filter box 97.

Figure 2A:
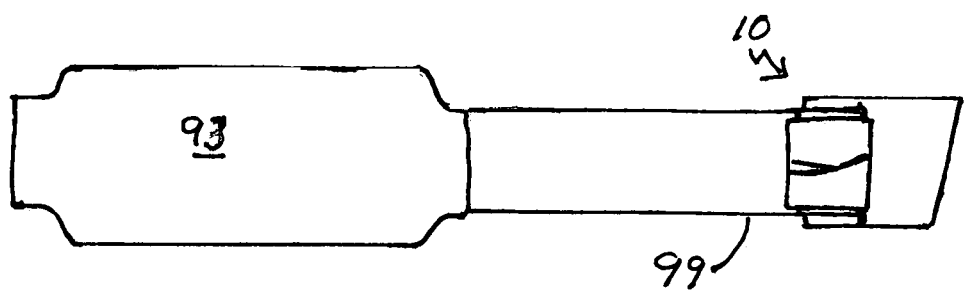
FIG. 2A is a sectional view of an exhaust gas flow subsystem which incorporates the device of the present invention and showing the catalytic converter and tailpipe of the subsystem.

FIG. 2A shows the device 10 mounted in an exhaust passageway or pipe 99. The tailpipe 99 is attached to a catalytic converter 93 which receives the exhaust gases from the muffler (not shown) and from the engine (not shown). The device provides a swirl to the exhaust gases resulting in a vortex shaped flow stream thereby drawing out the exhaust gases from the exhaust system.

Figure 2B:
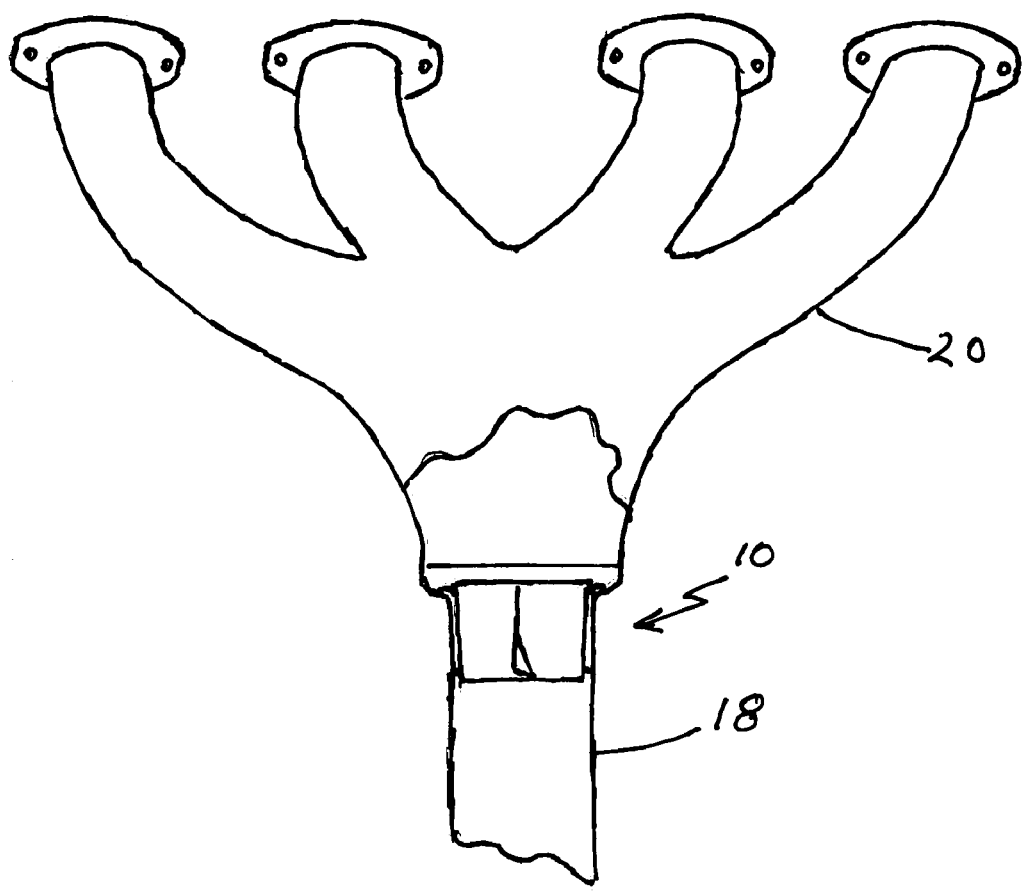
FIG. 2B is a sectional view of an exhaust gas flow subsystem which incorporates the device of the present invention and showing the exhaust manifold and exhaust pipe of the subsystem.
Figure 3:
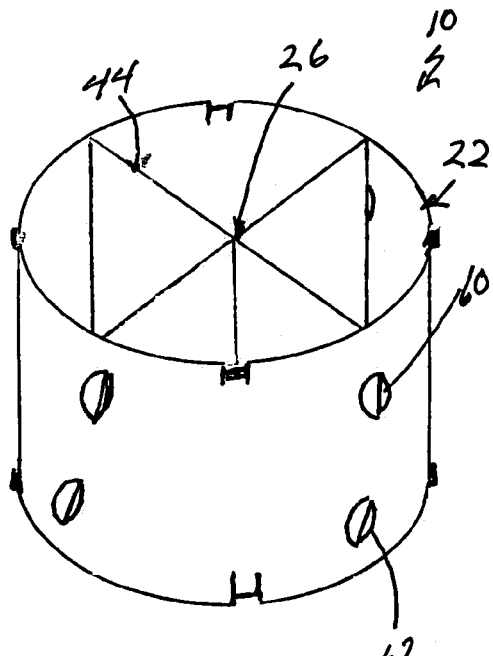
FIG. 3 is a perspective view of the device of the present invention.

FIG. 2B shows the device 10 mounted in another type of exhaust passageway or pipe 18. The exhaust pipe 18 is attached to an exhaust manifold 20 which receives the exhaust gases from the exhaust port (not shown) and combustion chamber (not shown) of the engine.

The device 10 is preferably manufactured in different sizes to accommodate the differently sized intake ducts and passageways of various makes and models of motor vehicles. The device includes a housing 22 which is preferably cylindrical in shape (having an axis 24) to accommodate standard intake ducts which are similarly cylindrical in shape. The housing 22 is open at both ends yet circumferentially closed. However, other shapes of housing may also be used to accommodate intake ducts having other shapes.

Figure 4:
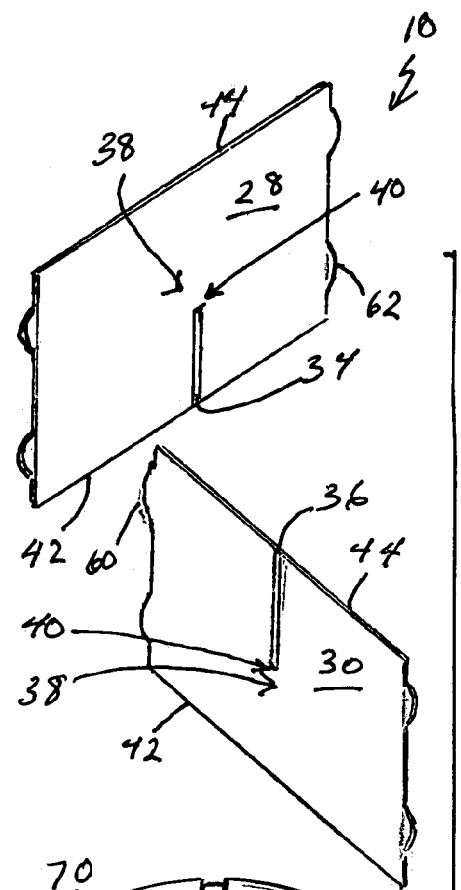
FIG. 4 is an exploded view of the device of the present invention.
Figure 4:
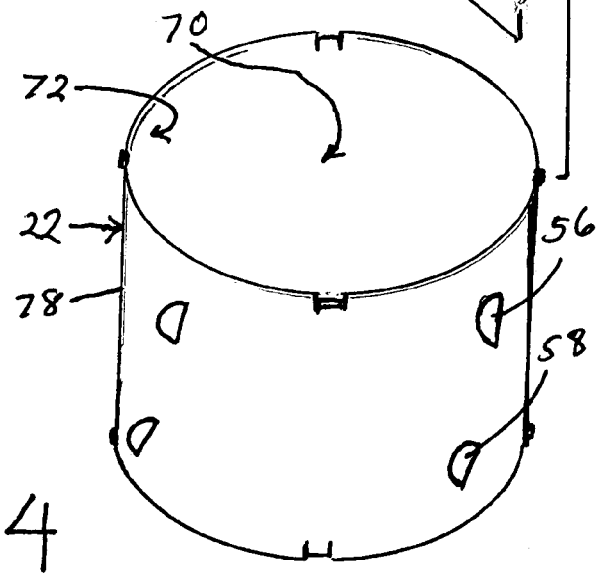
Figure 5:
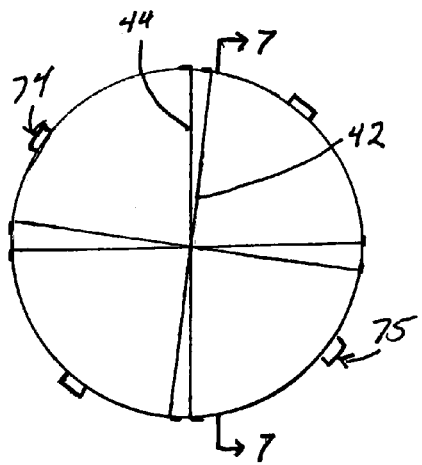
FIG. 5 is a top view of the device of the present invention.
Figure 6:
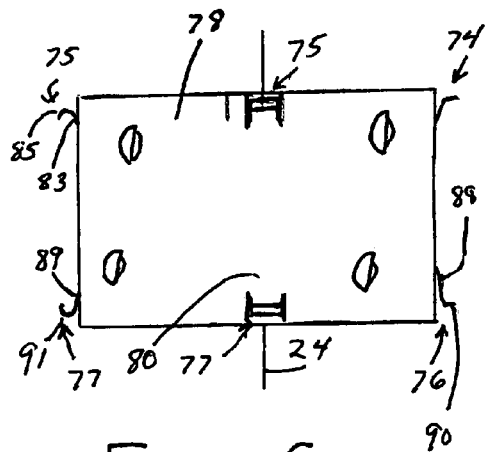
FIG. 6 is a side view of the device of the present invention showing the apertures thereof.
Figure 7:
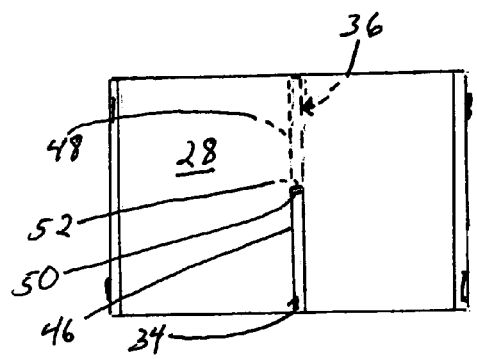
FIG. 7 is a longitudinal-sectional view of the device of the present invention taken along lines 6—6 of FIG. 4.

The device 10 utilizes a set of vanes 26 which are preferably a pair of vanes 28 and 30. The vanes 26 accomplish the desired objective of swirling the intake or exhaust fluid flow 32 passing through the passageway 12, passageway 90 or passageway 18. The vane 28 has a slit 34 and vane 30 has a slit 36. Slits 34 and 36 are both located at the laterally medial portion 38 of the vanes 26. The slits 34 and 36 extend axially from the center 40 of the vanes. Slit 34 extends downwardly to the lower or trailing edge 42 of vane 26. Slit 36 extends upwardly to the upper or leading edge 44 of vane 28. Slits 34 and 36 thus extend in opposite directions from the center 40, as shown in FIG. 4. Surfaces 46 and 48 define slit 34 and surfaces 50 and 52 define slit 36. The vanes 28 and 30 are joined together at the slits 34 and 36 so that lateral surfaces 46 and 50 abut flat surface medial portions 54 of vanes 28 and 30. The width of slits 34 and 36 i.e., the separation gap thereof, is preferably equal to the thickness of the vanes 26 at their flat surface medial portions 54 in order to provide a snug fit and thereby preclude lateral movement of the vanes 26 relative to each other. Additionally, when joined together, the longitudinal slit surfaces 48 and 52 abut each other thereby precluding axial movement of the vanes 26 in a direction toward each other. The depth. i.e., the axial dimensions, of the slits 34 and 36 are preferably equal to the axial length of the flat surface medial portions 54 so that the leading edges 44 of the vanes 26 are in alignment with each other i.e., the edges 44 of the vanes 26 are coplanar. Similarly, this renders the trailing edges 42 also in alignment with each other i.e., the edges 42 are coplanar.

Figure 8:
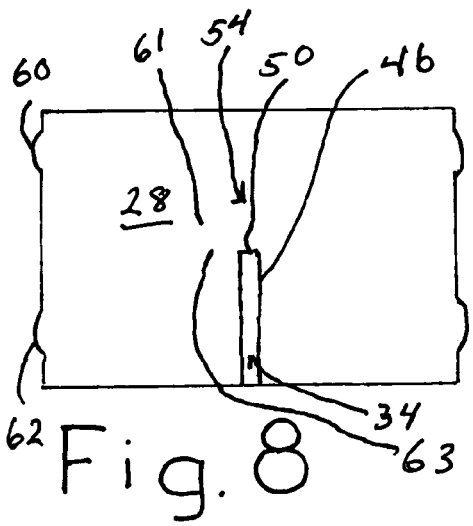
FIG. 8 is a front plan view of a representative vane of the device of the present invention.
Figure 9:
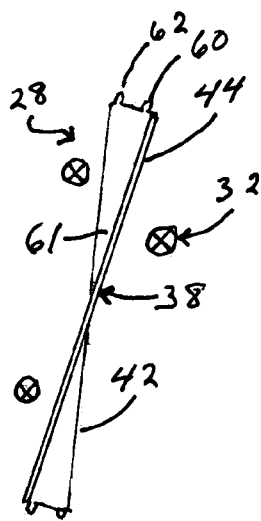
FIG. 9 is a top view of a representative vane of the device of the present invention as installed in the housing.

The vanes 28 and 30 are preferably planar and generally rectangular in shape, as shown in FIG. 8. The vanes 26 extend diametrically across the axis 24 the entire width of the housing 22 from one side of the housing to the opposite side. The leading edges 44 of vanes 26 extend in a straight line diametrically across the axis 24 from one side of the housing to the opposite side. The vanes 26 are oriented so that the leading edges 44 of vanes 26 are perpendicular to the leading edges 44 of vanes 28.

Figure 10:
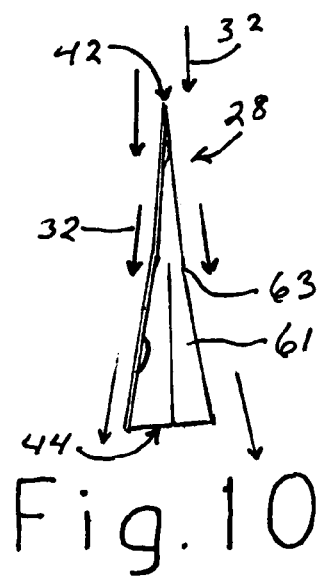
FIG. 10 is a side end view of a representative vane of the device of the invention as installed in the housing.

At diametrically opposite sides of the housing 22 are provided upper apertures 56 and lower apertures 58. The apertures 56 and 58 receive the upper and lower appendages 60 and 62 located at the ends 64 of vanes 26. The apertures 56 and 58 may be semi-circular (as shown) or rectangular and dimensioned to provide a snug fit between the apertures 56 and 58 and the appendages 60 and 62. The apertures 56 and 58 are partly defined by wall portions 64 and 66 which are preferably straight to engage the corresponding appendages 60 and 62 which are similarly straight (or flat). The apertures 56 and 58 and, more specifically, the wall portions 64 and 66 are angled so that they are inclined relative to the axis 24. The angle of inclination of the upper apertures 56 and the upper wall portions 64 are preferably six degrees with reference to the axis 24. The angle of inclination of the lower apertures 58 and the lower wall portions 66 are preferably nine degrees with reference to the axis 24. Thus, the angle of inclination of the lower apertures 58 relative to the upper apertures 56 is three degrees. Since the apertures 56 and 58 and appendages 60 and 62 and their corresponding vanes 28 and 30 snugly interfit, the angle of inclination of the apertures translates to the same angle of inclination of the vanes 26 at portions adjacent to the apertures 56 and 58. Adjacent to the apertures 56 and 58 the vanes 26 include flat planar portions 61 with a curved portion 63 therebetween, as shown in FIGS. 8 and 10. However, away from the apertures 56 and 58 (and the housing 22) at the middle portions 68 of the vanes 26 the vanes are entirely curved. The dual inclinations of the vanes 26 provide a more gradual deflection of the fluid stream impacting the vanes 26 thus minimizing the fluid flow forces exerted thereon and resulting in less energy absorption by the vanes 26. This allows the fluid flow to retain more of its kinetic energy than would otherwise occur thereby resulting in less of a decrease of fluid flow velocity. The result is these angled vane structures produce less restriction of fluid flow than would otherwise result.

The apertures 56 and 58 (and the straight wall portions 64 and 66) are preferably inclined at opposite directions at opposite sides of the housing 22. The apertures 56 and 58 (and wall portions 64 and 66) are thus inclined in a clockwise direction with respect to the housing 22. Concomitantly, the vanes 28 and 30 are oriented at an angle which is laterally clockwise from a vantage point of fluid flow 32 entering the housing 22. As a result, each of the vanes 28 and 30 are in a twisted configuration such that the angle of inclination changes from one direction to another across the axis 24 (and the central area 70 of the housing 22. Thus, the medial portion 38 of the vanes 26 are axially straight while peripheral portions are inclined. There is thus no deflection of the fluid flow at the central area 70 of the housing and progressively more deflection toward peripheral areas 72 of the housing. The vanes 26 thus effectively deflect the fluid flow 32 more at the peripheral areas 72. This particular orientation of the vanes 26 deflects the fluid flow 32 laterally thereby essentially turning it and producing a rotational motion of the fluid flow 32. This clockwise rotational movement subsequently results in a spiral shaped or votex movement of the fluid flow 32 that exits the housing 22. Since the peripheral areas 72 are the location where inducing rotational flow is most effective, the vanes 26 of the device 10 are very efficient in producing the desired rotational flow and the desired swirling or vortex fluid motion.

The housing is also provided with tabs 74, 75, 76 and 77 at the walls 78 of the housing 22. The tabs 74, 75, 76 and 77 extend radially outwardly from the main portion 80 of the walls 78 of the housing 22. The upper tabs 74 preferably include upper main portions 82 and upper peripheral portions 84 so that the upper peripheral portions 84 are inclined at an acute angle relative to the walls 78 and extend toward the trailing edge 42 of the vanes 26. The upper main portions 82 are inclined at an obtuse angle relative to the walls 78 and extend toward the leading edge 44 of the vanes 26. The upper main portions 82 are flat and the upper peripheral portions are also flat and inclined relative to the upper main portions 82. When suitably positioned in the intake duct 12, the upper peripheral portions 84 engage the rim 86 of the duct thereby preventing movement of the device 10 against the rim in a longitudinal direction relative to the duct preventing the device from moving deeper into the duct than desired. The lower tabs 76 similarly have lower main portions 88 and lower peripheral portions 90 so that the lower peripheral portions 90 are inclined at an obtuse angle relative to the walls 78 and extend toward the leading edge 44 of the vanes 26. The lower main portions 88 are similarly flat and the lower peripheral portions 90 are also flat and inclined relative to the lower main portion 88. The lower main portions 88 are inclined at an acute angle relative to the walls 78 and extend toward the trailing edge 42 of the vanes 26. When suitably positioned in the intake duct 12, the lower peripheral portions 90 engage the inner surfaces 92 of the duct 12. The upper tabs 75 preferably include upper main portions 83 and upper peripheral portions 85 so that the upper peripheral portions 85 are inclined at an acute angle relative to the walls 78 and extend toward the trailing edge 42 of the vanes 26. The upper main portions 83 are inclined at an obtuse angle relative to the walls 78 and extend toward the leading edge 44 of the vanes 26. The upper main portions 83 are curved and the upper peripheral portions 85 are also curved and inclined relative to the upper main portions 83. When suitably positioned in the intake duct 12, the upper peripheral portions 85 engage the rim 86 of the duct thereby preventing movement of the device 10 against the rim in a longitudinal direction relative to the duct preventing the device from moving deeper into the duct that desired. The lower tabs 77 similarly have lower main portions 89 and lower peripheral portions 91 so that the lower peripheral portions 91 are inclined at an obtuse angle relative to the walls 78 and extend toward the leading edge 44 of the vanes 26. The lower main portions 89 are similarly curved and the lower peripheral portions 91 are also curved and inclined relative to the lower main portion 89. The lower main portions 89 are inclined at an acute angle relative to the walls 78 and extend toward the trailing edge 42 of the vanes 26. When suitably positioned in the intake duct 12, the lower peripheral portions 91 engage the inner surfaces 92 of the duct. The relatively small end portion 95 of the lower peripheral portion 91 tends to produce a gripping effect effectively holding the device in the desired position within the duct 12. The tabs 74, 75, 76 and 77 are composed of spring steel or other suitable substance which has memory such that it resists movement from its position in which extending outwardly from the housing walls 78. Thus, when the diametrical dimensions of the housing relative to the duct 12 result in inward deflection of the tabs 76 and 77 when the device is installed in the duct 12, the resistive force of the tabs 76 and 77 serve to resist movement of the device 10 relative to the duct 12. This tends to retain the device 10 within the duct 12. The upper main portions 82 and 83 and upper peripheral portions 84 and 85 as well as the lower main portions 88 and 89 and lower peripheral portions 90 and 91 are planar but may be other suitable shapes rather than curved or flat.

The device 10 is used in an intake duct 12 to provide swirl to the fluid flow exiting the device but may also be used in an intake manifold or runner to swirl the fluid flow which includes both air and fuel. However, when used in a tailpipe, exhaust pipe or other portion of the exhaust system, the device 10 also provides swirl of the fluid flow exiting the device but the ultimate purpose of this application is not to provide mixing of the fluid components but simply to improve exhaust gas flow. Basically, the device 10 functions to draw out exhaust gases from the exhaust system. The improved exhaust gas flow in effect scavenges the exhaust gases from the exhaust ports resulting in improved intake fluid flow through the engine providing increased power.

Accordingly, there has been provided, in accordance with the invention, a device for swirling the fluid flow passing through the passageway of an intake or exhaust system of an internal combustion engine that fully satisfies the objectives set forth above. It is to be understood that all terms used herein are descriptive rather than limiting. Although the invention has been described in conjunction with the specific embodiment set forth above, many alternative embodiments, modifications and variations will be apparent to those skilled in the art in light of the disclosure set forth herein. Accordingly, it is intended to include all such alternatives, embodiments, modifications and variations that fall within the spirit and scope of the invention set forth in the claims hereinbelow.

What is claimed is:

1. A fluid swirling device for insertion in intake system of an internal combustion engine, comprising:
   a housing;
   a set of vanes mounted within said housing, each vane of said set of vanes having a medial slit extending partly along a length of said each vane, said set of vanes interconnected together at the slits, said set of vanes being entirely flat planar.

2. The device of claim 1 wherein said set of vanes are angled in order to deflect fluid of a fluid stream passing through said housing and alongside said set of vanes and impart a swirling motion thereto.

3. The device of claim 1 wherein said set of vanes have a set of appendages at lateral edges thereof and wherein said housing has a set of apertures for receiving said set of appendages in order to secure said set of vanes to said housing.

4. The device of claim 3 wherein said set of apertures include a set of pairs of apertures each pair of apertures oriented at an angle of inclination relative to direction of flow of fluid stream entering said housing.

5. The device of claim 4 wherein said pair of apertures includes an upper aperture and a lower aperture, said lower aperture at an angle of inclination relative to said upper aperture and relative to the direction of flow of fluid stream entering said housing.

6. The device of claim 1 wherein said housing includes a wall having an upper tab and a lower tab, said upper tab and said lower tab extending outwardly from main body of said wall, said upper tab having a main portion forming an obtuse angle relative to the wall and a peripheral portion forming an acute angle relative to the wall.

7. The device of claim 6 wherein said upper tab is located at a longitudinally upper end portion of said wall and wherein said lower tab is located at a longitudinally lower end portion of said wall.

8. The device of claim 7 wherein said upper tab includes an upper main portion and an upper peripheral portion and wherein said lower tab includes a lower main portion and a lower peripheral portion, said lower main portion and said upper main portion angled outwardly from said main body of said wall and said lower peripheral portion extending toward said upper end portion and said upper peripheral portion extending toward said lower end portion.

9. The device of claim 6 wherein said upper tab is curved and wherein said lower tab is curved.

10. The device of claim 6 wherein said upper tab is flat and wherein said lower tab is flat.

11. The device of claim 6 wherein said upper tabs and said lower tabs are composed of a material providing memory so that deflection from the angled orientation provides a resistive force to the deflection so that insertion of said housing in an engine duct enables retention therein by means of the resistive force exerted upon inner walls of the duct and by means of the resistive force exerted upon edge of the duct.

12. The device of claim 1 wherein said vanes include a first vane having a first vane leading edge and a second vane having a second vane leading edge, said first vane and said second vane oriented so that said first vane leading edge is perpendicular to said second vane leading edge.

13. A fluid swirling device for insertion in intake system of an internal combustion engine, comprising:
a cylindrical housing open at longitudinal ends thereof and circumferentially closed;
a set of vanes mounted within said housing, each vane of said set of vanes having a medial slit extending partly along a length of said each vane, said set of vanes interconnected together at the slits, the slit of each vane extending in an axial direction, said set of vanes having a set of pairs of appendages at lateral edges thereof and said housing having a set of pairs of apertures for receiving said set of pairs of appendages in order to secure said set of vanes to said housing, each pair of apertures oriented at an angle of aperture inclination relative to direction of flow of fluid stream entering said housing in order to position said set of vanes at angles of end vane portion inclination equal to said angle of aperture inclination.

14. The device of claim 13 wherein the slit extends from a center portion of said each vane in an axial direction to an edge thereof so that the slit of one said set of vanes extends in a direction opposite to that of another of said set of vanes to which connected at the slits thereof.

15. A fluid swirling device for insertion in an exhaust system of an internal combustion engine, comprising:
a housing;
a set of vanes mounted within said housing, each vane of said set of vanes having a medial slit extending partly along a length of said each vane, said set of vanes interconnected together at the slits said set of vanes being entirely flat planar.

16. The device of claim 15 wherein said set of vanes are angled in order to deflect fluid of a fluid stream passing through said housing and alongside said set of vanes and impart a swirling motion thereto.

17. The device of claim 15 wherein said set of vanes have a set of appendages at lateral edges thereof and wherein said housing has a set of apertures for receiving said set of appendages in order to secure said set of vanes to said housing.

18. The device of claim 15 further including a set of pairs of apertures each pair of apertures oriented at an angle of inclination relative to direction of flow of fluid stream entering said housing.

19. The device of claim 15 wherein said housing includes a wall having an upper tab and a lower tab, said upper tab and said lower tab extending outwardly from main body of said wall, said upper tab having a main portion forming an obtuse angle relative to the wall and a peripheral portion forming an acute angle relative to the wall.

20. The device of claim 19 wherein said upper tab is located at a longitudinally upper end portion of said wall and wherein said lower tab is located at a longitudinally lower end portion of said wall.

21. The device of claim 19 wherein said upper tab includes an upper main portion and an upper peripheral portion and wherein said lower tab includes a lower main portion and a lower peripheral portion, said lower main portion and said upper main portion angled outwardly from said main body of said wall and said lower peripheral portion extends toward said upper end portion and said upper peripheral portion extends toward said lower end portion.

22. The device of claim 19 wherein said upper tab is curved and wherein said lower tab is curved.

23. The device of claim 19 wherein said upper tabs and said lower tabs are composed of a material providing memory so that deflection from the angled orientation provides a resistive force to the deflection so that insertion of said housing in an engine duct enables retention therein by means of the resistive force exerted upon inner walls of the duct and by means of the resistive force exerted upon edge of the duct.

24. The device of claim 19 wherein said vanes include a first vane having a first vane leading edge and a second vane having a second vane leading edge, said first vane and said second vane oriented so that said first vane leading edge is perpendicular to said second vane leading edge.

25. A fluid swirling device for insertion in exhaust passageway of an internal combustion engine, comprising:
a cylindrical housing open at longitudinal ends thereof and circumferentially closed;
a set of vanes mounted within said housing, each vane of said set of vanes having a medial portion and a medial slit extending partly along a length of said each vane, said set of vanes interconnected together at the slits, said set of vanes being entirely flat planar, the slit of each vane extending in an axial direction so that said medial portion of said each vane oriented in an axial direction, said set of vanes having a set of pairs of appendages at lateral edges thereof and said housing having a set of pairs of apertures for receiving said set of pairs of appendages in order to secure said set of vanes to said housing, each pair of apertures oriented at an angle of aperture inclination relative to direction of flow of fluid stream entering said housing and relative to said medial portion in order to position said set of vanes at angles of end vane portion inclination equal to said angle of aperture inclination.

26. The device of claim 25 wherein the slit extends from a center portion of said each vane in an axial direction to an edge thereof so that the slit of one said set of vanes extends in a direction opposite to that of another of said set of vanes to which connected at the slits thereof.

* * * * *